United States Patent
Eom et al.

(10) Patent No.: US 9,280,022 B2
(45) Date of Patent: Mar. 8, 2016

(54) LIQUID CRYSTAL DISPLAY DEVICE

(71) Applicant: LG DISPLAY CO., LTD., Seoul (KR)

(72) Inventors: You Hyun Eom, Yongin-si (KR); Yun Hee Choi, Incheon (KR)

(73) Assignee: LG DISPLAY CO., LTD., Seoul (KR)

(*) Notice: Subject to any disclaimer, the term of this patent is extended or adjusted under 35 U.S.C. 154(b) by 239 days.

(21) Appl. No.: 13/899,035

(22) Filed: May 21, 2013

(65) Prior Publication Data

US 2013/0308083 A1 Nov. 21, 2013

(30) Foreign Application Priority Data

May 21, 2012 (KR) .......................... 10-2012-0053582

(51) Int. Cl.
| | |
|---|---|
| *G02F 1/139* | (2006.01) |
| *G02F 1/1343* | (2006.01) |
| *C09K 19/54* | (2006.01) |
| *C09K 19/20* | (2006.01) |
| *C09K 19/30* | (2006.01) |
| *C09K 19/02* | (2006.01) |
| *C09K 19/12* | (2006.01) |
| *C09K 19/04* | (2006.01) |
| *C09K 19/52* | (2006.01) |

(52) U.S. Cl.
CPC .......... *G02F 1/134363* (2013.01); *C09K 19/02* (2013.01); *C09K 19/54* (2013.01); *C09K 19/12* (2013.01); *C09K 2019/0466* (2013.01); *C09K 2019/301* (2013.01); *C09K 2019/3009* (2013.01); *C09K 2019/3016* (2013.01); *C09K 2019/521* (2013.01)

(58) Field of Classification Search
CPC .................. C09K 19/12; C09K 19/54; C09K 2019/0466; C09K 2019/521; C09K 2019/301; C09K 2019/3016; C09K 2019/3009; G02F 1/1392; G02F 1/1343
See application file for complete search history.

(56) References Cited

U.S. PATENT DOCUMENTS

2012/0001170 A1\* 1/2012 Yamazaki ........................ 257/43

FOREIGN PATENT DOCUMENTS

| JP | 58103578 | \* | 6/1983 |
|---|---|---|---|
| JP | 201257038 A | | 3/2012 |

\* cited by examiner

*Primary Examiner* — Shean C Wu
(74) *Attorney, Agent, or Firm* — Brinks Gilson & Lione

(57) ABSTRACT

An LCD device includes first and second substrates facing each other, a sealant formed between the first and second substrates, and adhering the first substrate to the second substrate, and a liquid crystal layer formed between the first and second substrates. The liquid crystal layer includes liquid crystal and an additive having a dipole moment characteristic when an electric field is applied thereto, thus enhancing a response time of the liquid crystal.

17 Claims, 4 Drawing Sheets

LIQUID CRYSTAL DISPLAY DEVICE

CROSS-REFERENCE TO RELATED APPLICATIONS

This application claims the benefit of the Korean Patent Application No. 10-2012-0053582 filed on May 21, 2012, which is hereby incorporated by reference as if fully set forth herein.

BACKGROUND

1. Field of the Invention

The present invention relates to a liquid crystal display (LCD) device, and more particularly, to an LCD device having the properties of reduced power consumption by being driven with a low driving voltage, and a fast response time.

2. Discussion of the Related Art

Generally, since LCD devices are driven with a low operating voltage, LCD devices have low power consumption and are used as portable devices. Accordingly, LCD devices are widely applied to various fields such as notebook computers, monitors, spacecrafts, airplanes, etc.

LCD devices include a lower substrate, an upper substrate, and a liquid crystal layer formed therebetween. In LCD devices, the alignment of liquid crystal in a liquid crystal layer is adjusted with an electric field, and thus, light transmittance of the LCD device is adjusted, thereby displaying an image.

LCD devices are variously developed in a twisted nematic (TN) mode, a vertical alignment (VA) mode, an in-plane switching (IPS) mode, or a fringe field switching (FFS) mode depending on a scheme of adjusting the alignment of liquid crystal.

Among the modes, the IPS mode and the FFS mode are modes in which a plurality of pixel electrodes and common electrodes are arranged on a lower substrate, and thus, the alignment of liquid crystal is adjusted with electric fields between the pixel electrodes and the common electrodes.

The IPS mode is a mode in which a plurality of pixel electrodes and common electrodes are alternately arranged in parallel, and thus, lateral electric fields are respectively generated between the pixel electrodes and the common electrodes, thereby adjusting the alignment of liquid crystal. The FFS mode is a mode in which a pixel electrode and a common electrode is formed to be separated from each other with an insulating layer therebetween, one of the pixel electrode and common electrode is formed in a plate shape, and the other is formed in a finger shape, thereby adjusting the alignment of liquid crystal with fringe fields generated between the pixel electrodes and the common electrodes.

Hereinafter, a related art IPS-mode LCD device will be described with reference to FIG. 1.

FIG. 1 is a sectional view schematically illustrating the related art IPS-mode LCD device.

As seen in FIG. 1, the related art IPS-mode LCD device includes an upper substrate 10, a lower substrate 20, a sealant 30, and a liquid crystal layer 40.

A light blocking layer 12, a color filter layer 14, and an overcoat layer 16 are sequentially formed on the upper substrate 10.

The light blocking layer 12 prevents leakage of light to an area other than a pixel area, and is formed in a matrix structure.

The color filter layer 14 is formed on the light blocking layer 12, and includes a plurality of red (R), green (G), blue (B) color filters.

The overcoat layer 16 is formed on the color filter layer 14, and planarizes a substrate.

An array layer 22, a plurality of pixel electrodes 24, and a plurality of common electrodes 26 are formed on the lower substrate 20.

The array layer 22 includes a plurality of gate lines (not shown) and a plurality of data lines (not shown) which intersect each other to define a plurality of pixel areas, and a plurality of thin film transistors (TFTs) that are respectively formed in the pixel areas defined by intersections of the gate lines and data lines.

The pixel electrodes 24 are formed on the array layer 22, and are electrically connected to the respective TFTs inside the array layer 22.

The common electrodes 26 are formed on the array layer 22, and generate electric fields together with the pixel electrodes 24 to drive the liquid crystal layer 30.

The sealant 30 is formed between the upper substrate 10 and the lower substrate 20. The upper substrate 10 is adhered to the lower substrate 20 by the sealant 30.

The liquid crystal layer 40 is formed between the upper substrate 10 and the lower substrate 20. In the liquid crystal layer 40, alignment of liquid crystal is adjusted according to a direction of an electric field generated by the pixel electrode 24 and the common electrode 26.

However, the related art IPS-mode LCD device has the following limitations. Generally, it may be desired to drop a driving voltage of an LCD device to reduce the power consumption of the LCD device. The liquid crystal for the liquid crystal layer 40 may be used to drop the driving voltage of the LCD device when the absolute value of dielectric anisotropy ($\Delta\epsilon = \epsilon_{//} - \epsilon_{\perp}$) of the liquid crystal is high. As an example, when positive liquid crystal is used as the liquid crystal of the liquid crystal layer 40, the driving voltage may be further dropped in cases, where dielectric anisotropy ($\Delta\epsilon$) is 4, compared with cases where dielectric anisotropy ($\Delta\epsilon$) is 3. As another example, when negative liquid crystal is used as the liquid crystal of the liquid crystal layer 40, the driving voltage may be further dropped in cases where dielectric anisotropy ($\Delta\epsilon$) is −4, compared with cases where dielectric anisotropy ($\Delta\epsilon$) is −3.

However, when the negative liquid crystal having a high absolute value of dielectric anisotropy ($\Delta\epsilon = \epsilon_{//} - \epsilon_{\perp}$) is used for dropping a driving voltage, the rotational viscosity of the liquid crystal may substantially increase and thus, the response time of the liquid crystal may become slower.

SUMMARY

Accordingly, the present invention may provide an LCD device that substantially obviates one or more problems due to limitations and disadvantages of the related art. One aspect of the present invention may provide an LCD device having a fast response time.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device is provided that includes first and second substrates facing each other; a sealant formed between the first and second substrates, and adhering the first substrate to the second substrate; and a liquid crystal layer formed between the first and second substrates, wherein the liquid crystal layer includes liquid crystal and an additive having a dipole moment characteristic when an electric field is applied thereto. In this embodiment, size of the additive is larger than size of a liquid crystal molecule such that a rotation motion of the additive causes the liquid crystal molecule to rotate.

In another embodiment, a liquid crystal display (LCD) device includes first and second substrates facing each other; a sealant formed between the first and second substrates, and adhering the first substrate to the second substrate; a liquid crystal layer formed between the first and second substrates and including a plurality of liquid crystal molecules; and a plurality of particles dispersed in the liquid crystal layer and configured to rotate when an electric field is applied thereto such that torque is transferred to the liquid crystal molecules adjacent to each particle. In this embodiment, size of a liquid crystal molecule is smaller than size of a particle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts. Hereinafter, embodiments of the present invention will be described in detail with reference to the accompanying drawings.

Figure 1:
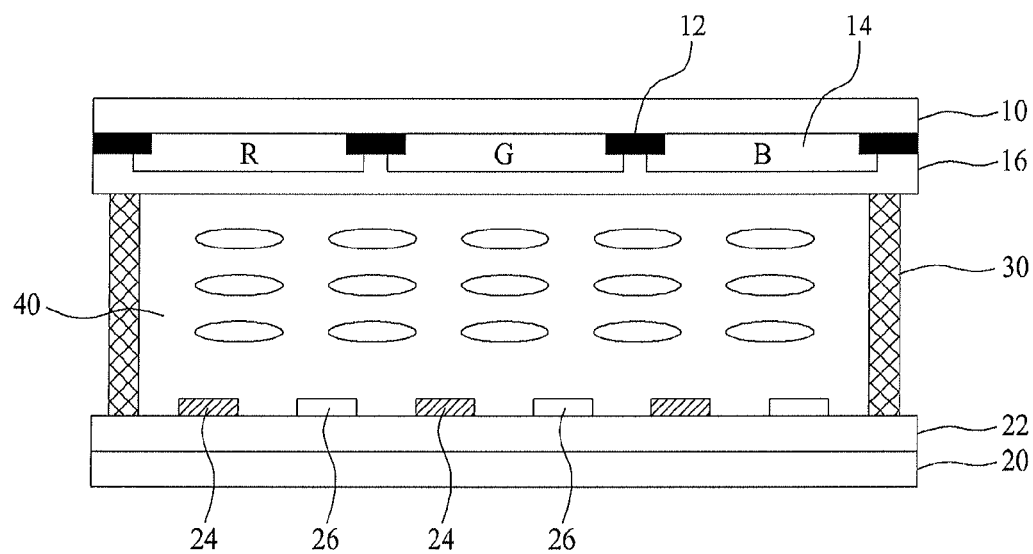
FIG. 1 is a sectional view schematically illustrating a related art IPS-mode LCD device.
Figure 2:
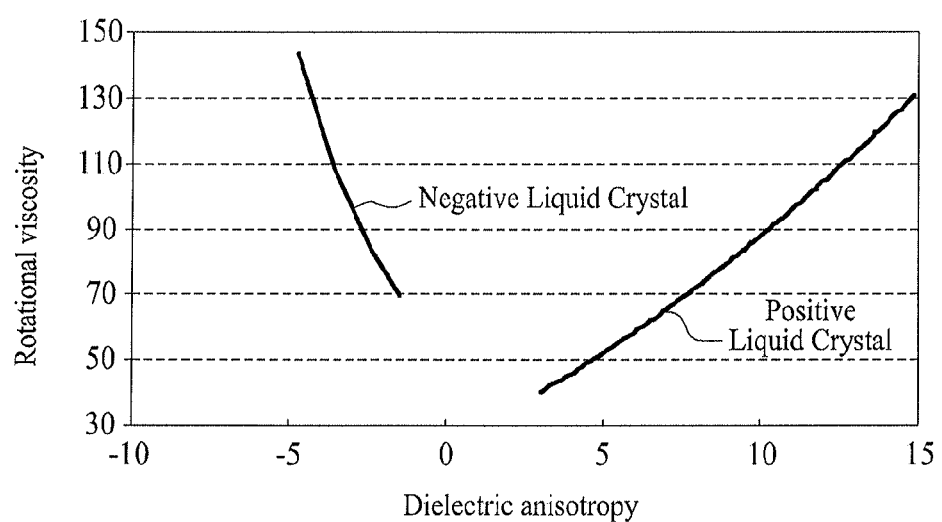
FIG. 2 is a graph showing the changes in rotational viscosity due to the changes in dielectric anisotropy of liquid crystal.

FIG. 2 is a graph showing the relationship of dielectric anisotropy and rotational viscosity of positive and negative liquid crystal. The positive liquid crystal is liquid crystal having a dielectric anisotropy ($\Delta \in = \in // - \in \perp$) of positive (+) value, namely, liquid crystal in which a horizontal permittivity ($\in //$) is greater than a vertical permittivity ($\in \perp$), and which has a characteristic that director of the liquid crystal is aligned in parallel to a direction of an electric field. Moreover, the negative liquid crystal is liquid crystal having a dielectric anisotropy ($\Delta \in = \in // - \in \perp$) of a negative, namely, liquid crystal in which a horizontal permittivity ($\in //$) is less than a vertical permittivity ($\in \perp$), and which has a characteristic that director of the liquid crystal is aligned vertically to a direction of an electric field.

As shown in FIG. 2, the higher the absolute value of dielectric anisotropy, the higher the rotational viscosities of positive liquid crystal and negative liquid crystal. Therefore, rotational viscosity may affect the rotational motion of liquid crystal based on a direction of an electric field applied thereto, thereby changing the response time of the liquid crystal. For example, since the negative liquid crystal is higher in the increase rate of rotational viscosity than the positive liquid crystal as shown in FIG. 2, the response time of the negative liquid crystal may be more affected than that of the positive liquid crystal.

Figure 3A:
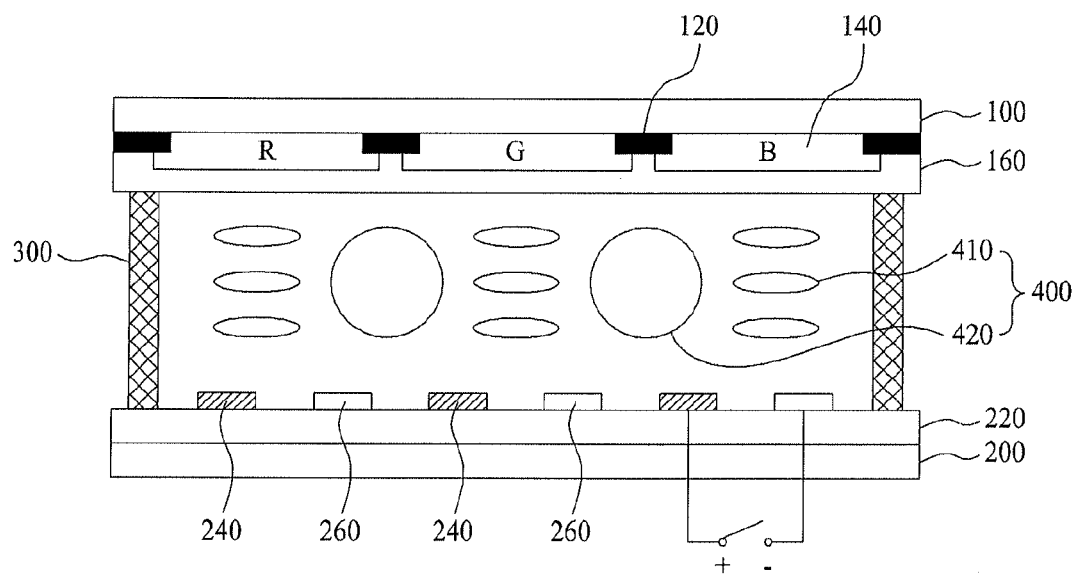
FIG. 3A is a sectional view schematically illustrating an LCD device according to an embodiment of the present invention when an electric field is not applied thereto, and relates to an IPS-mode LCD device.
Figure 3B:
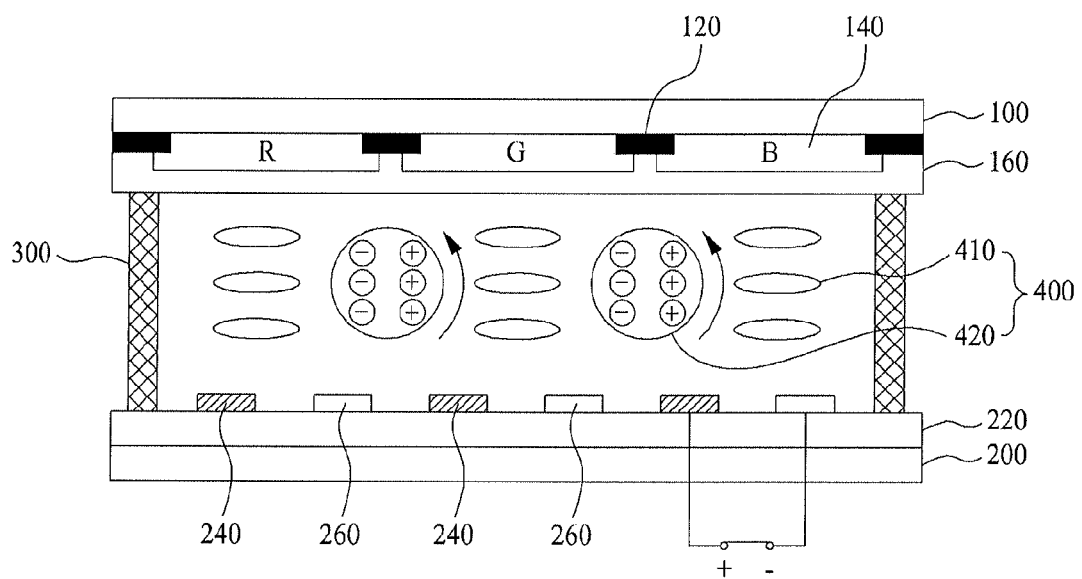
FIG. 3B is a sectional view schematically illustrating an LCD device according to an embodiment of the present invention when an electric field is applied thereto, and relates to an IPS-mode LCD device

FIG. 3A is a sectional view schematically illustrating an LCD device according to an embodiment of the present invention when an electric field is not applied thereto, and relates to an IPS-mode LCD device. FIG. 3B is a sectional view schematically illustrating an LCD device according to an embodiment of the present invention when an electric field is applied thereto, and relates to an IPS-mode LCD device.

As seen in FIG. 3A and 3B, the LCD device according to an embodiment of the present invention includes a first substrate 100, a second substrate 200, a sealant 300, and a liquid crystal layer 400. A light blocking layer 120, a color filter layer 140, and an overcoat layer 160 are sequentially formed on the first substrate 100. The light blocking layer 120 prevents leakage of light to an area other than a pixel area, and is formed in a matrix structure.

The color filter layer 140 is formed on the light blocking layer 120, and includes a plurality of red (R), green (G), blue (B) color filters. Depending on a case, the color filter layer 140 may additionally include a plurality of yellow (Y) or cyan (C) color filters, in which case the color filter layer 140 includes four types of color filters having different colors. The overcoat layer 160 is formed on the color filter layer 140, and planarizes a substrate. Although not shown, a column spacer for maintaining a cell gap may be additionally formed on the overcoat layer 160.

An array layer 220, a plurality of pixel electrodes 240, and a plurality of common electrodes 260 are formed on the second substrate 200. The array layer 220, although not specifically shown, includes a plurality of gate lines, and a plurality of data lines, and a plurality of thin film transistors (TFTs) that are respectively formed in a plurality of pixel areas defined by intersections of the gate lines and data lines The gate lines and the data lines intersect each other to define a plurality of pixel areas. Each of the TFTs is connected to a corresponding gate line and data line, and formed in a corresponding pixel area. Each TFT may include a gate electrode connected to a corresponding gate line, a semiconductor layer acting as an electron transfer channel, a source electrode connected to the data line, a drain electrode facing the source electrode, and a passivation protecting the source electrode and the drain electrode. Each TFT may be formed in a bottom gate structure in which the gate electrode is disposed under the semiconductor layer, or a top gate structure in which the gate electrode is disposed over the semiconductor layer. Various other constructions of the array layer 220 are available.

The pixel electrodes 240 are formed on the array layer 220, and are electrically connected to the respective TFTs inside the array layer 220. The common electrodes 260 are formed on the array layer 220, and generate electric fields together with the pixel electrodes 240 to drive liquid crystal 410 in the liquid crystal layer 400. The pixel electrodes 240 and the common electrodes 260 are alternately arranged to generate lateral electric fields. The pixel electrodes 240 and the common electrodes 260, as illustrated, may be arranged on the same layer or on different layers.

The sealant 300 is formed between the first substrate 100 and the second substrate 200. The first substrate 100 is adhered to the second substrate 200 by the sealant 300. The liquid crystal layer 400 is formed between the first substrate 100 and the second substrate 200. The liquid crystal layer 400 includes the liquid crystal 410 and an additive 420. Alignment of the liquid crystal 410 is adjusted according to a direction of electric fields generated by the pixel electrodes 240 and the common electrodes 260.

The liquid crystal 410 may comprise positive liquid crystal having a dielectric anisotropy ($\Delta\varepsilon = \varepsilon_{//} - \varepsilon_{\perp}$) of a positive (+) value, or negative liquid crystal having a dielectric anisotropy ($\Delta\varepsilon = \varepsilon_{//} - \varepsilon_{\perp}$) of a negative (−) value. Considering luminance characteristics of LCD devices, it may be preferable that the liquid crystal 410 may comprise the negative liquid crystal. For instance, a liquid crystal display device using the negative liquid crystal may achieve better luminance than a liquid crystal display device using the positive liquid crystal. This will be described in detail below.

Figure 4A:
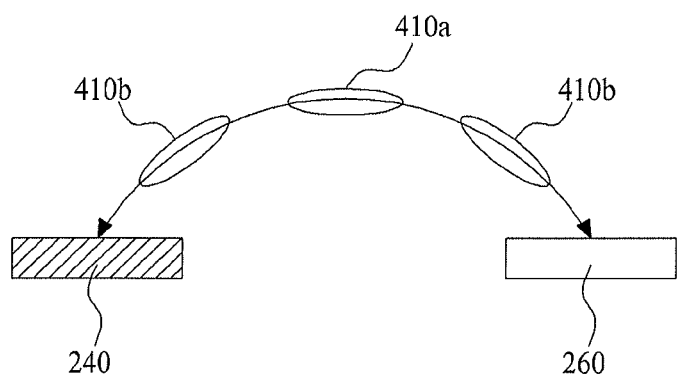
FIG. 4A illustrates an alignment state of positive liquid crystal when an electric field is applied thereto.
Figure 4B:
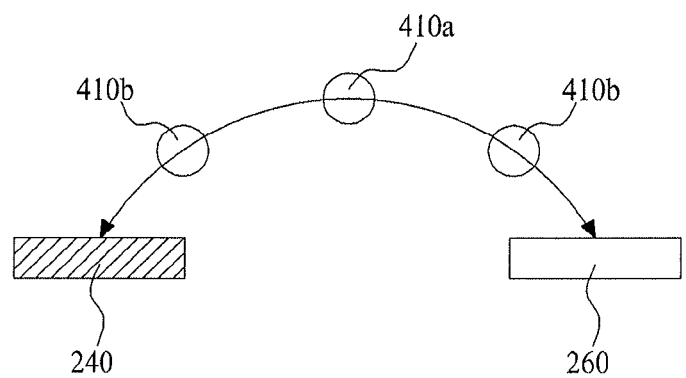
FIG. 4B illustrates an alignment state of negative liquid crystal when an electric field is applied thereto.

FIG. 4A illustrates an alignment state of positive liquid crystal when an electric field is applied thereto. FIG. 4B illustrates an alignment state of negative liquid crystal when an electric field is applied thereto.

As seen in FIG. 4A, the positive liquid crystal has a characteristic in which director of the positive liquid crystal is aligned in parallel to a direction of an electric field. Thus, when an electric field is generated between the pixel electrode 240 and the common electrode 260, a director of a liquid crystal molecule 410a in an area between the pixel electrode 240 and the common electrode 260, which is not overlapped with the pixel electrode 240 and the common electrode 260, is aligned in parallel to a horizontal plane of a substrate. But, when an electric field is generated between the pixel electrode 240 and the common electrode 260, a director of liquid crystal molecules 410b in respective areas above the pixel electrode 240 and common electrode 260, which are overlapped with the pixel electrode 240 and the common electrode 260, is aligned to be tilted at a certain angle with respect to the horizontal plane of the substrate. Like this, when director of liquid crystal is aligned to be tilted at a certain angle with respect to the horizontal plane of the substrate, light transmittance is reduced in a corresponding area.

Moreover, as seen in FIG. 4B, the negative liquid crystal has a characteristic in which director of the negative liquid crystal is aligned vertically to a direction of an electric field. Thus, when an electric field is generated between the pixel electrode 240 and the common electrode 260, a director of a liquid crystal molecule 410a in an area between the pixel electrode 240 and the common electrode 260 and a director of liquid crystal molecules 410b in respective areas above the pixel electrode 240 and common electrode 260 are aligned in parallel to the horizontal plane of the substrate. Accordingly, the negative liquid crystal may enhance light transmittance compared with the positive liquid crystal, thus showing a relatively better luminance characteristic.

Figure 5:
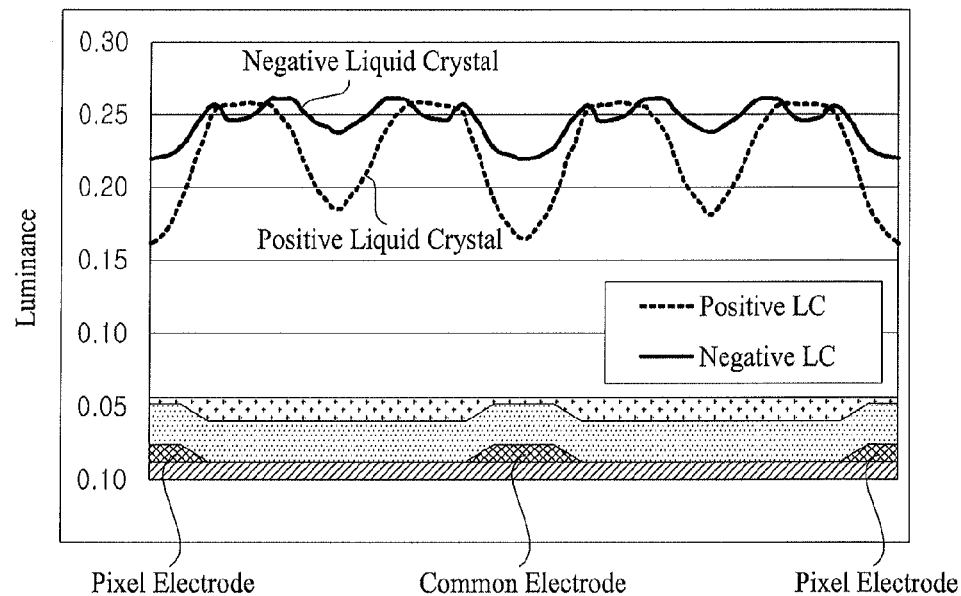
FIG. 5 is a graph showing luminance changes in a case using the positive liquid crystal and a case using the negative liquid crystal.

FIG. 5 is a graph showing luminance changes in a case using the positive liquid crystal and a case using the negative liquid crystal. In FIG. 5, it can be seen that a case using the negative liquid crystal shows better luminance than a case using the positive liquid crystal, and particularly, shows better luminance in an area directly above each of the pixel electrode and common electrode. In addition, using the negative liquid crystal may be more effective in a liquid crystal display device having a tight space between pixel electrodes and common electrodes as the negative liquid crystal can still properly rotate to transmit light directly above each of the pixel electrode and common electrode.

As described above, when the liquid crystal 410 has a high absolute value ($|\Delta\varepsilon|$) of dielectric anisotropy, a driving voltage can be dropped, thus reducing power consumption. Considering such advantages, the absolute value ($|\Delta\varepsilon|$) of dielectric anisotropy of the liquid crystal 410 may be 2 or more. For example, when the absolute value ($|\Delta\varepsilon|$) of dielectric anisotropy of the liquid crystal 410 is less than 2, the driving voltage increases, causing an increase in power consumption.

Here, dielectric anisotropy ($\Delta\varepsilon$) is a value which has been measured by using an electrical signal having a frequency of 1 kHz at a temperature of 20° C. In the specification to be described later, dielectric anisotropy, a vertical permittivity, or a horizontal permittivity is also a value measured in the same condition.

Moreover, as the absolute value ($|\Delta\varepsilon|$) of dielectric anisotropy of the liquid crystal 410 increases, the rotational viscosity of the liquid crystal 410 increases, and thus, a response time of an LCD device increases. However, according to the present invention, the additive 420 aids in the rotational motion of the liquid crystal 410, thereby enhancing a response time.

However, although the additive 420 helps to reduce the response time, if the absolute value ($|\Delta\varepsilon|$) of dielectric anisotropy of the liquid crystal 410 is excessively high, it may become difficult to enhance the response time with the aid of the additive 420. For this reason, the absolute value ($|\Delta\varepsilon|$) of dielectric anisotropy of the liquid crystal 410 may be 20 or less. That is, if the absolute value ($|\Delta\varepsilon|$) of dielectric anisotropy of the liquid crystal 410 exceeds 20, it cannot be expected to reduce the response time of liquid crystal.

A material expressed by the following Formula 1 may be used as the negative liquid crystal 410, but is not limited thereto.

R1-A-R2                                           [Formula 1]

where each of R1 and R2 is hydrogen (H), an alkyl group, an alkoxy group, an alkenyl group CN, F, Cl, $CF_3$, $OCF_3$, S, or NCS. A is alkyl —COO—, —$CF_2$O—,

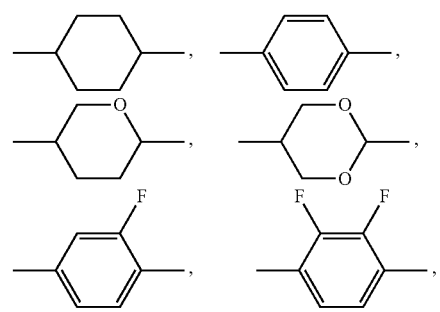

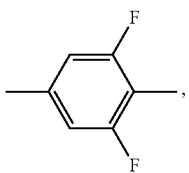

a bonding structure of two or more different compounds thereof, a bonding structure of two or more same compounds thereof, or a repeating unit of the bonding structure.

As a detailed example of the negative liquid crystal 410, each of compounds expressed by the following Formulas 2 to 4 may be used, but are not limited thereto.

[Formula 2]

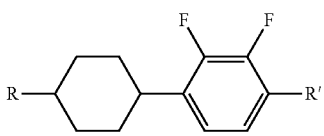

[Formula 3]

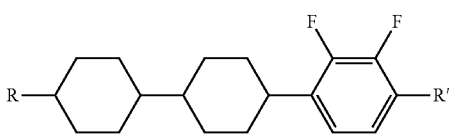

[Formula 4]

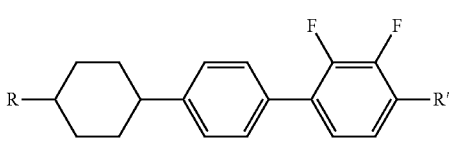

where each of R and R' is hydrogen, an alkyl group, an alkenyl group, or an alkoxy group.

Moreover, each of materials expressed by the following Formulas 5 to 7 may be used as the positive liquid crystal 410, but are not limited thereto.

[Formula 5]

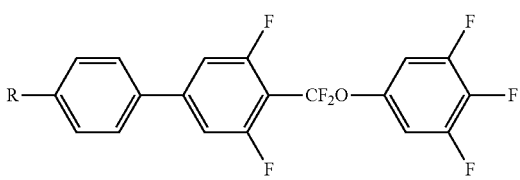

[Formula 6]

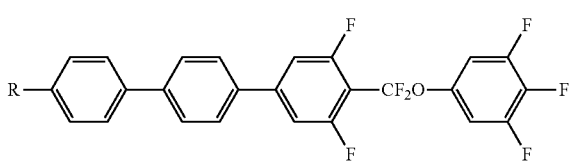

[Formula 7]

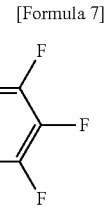

where R is hydrogen, an alkyl group, an alkenyl group, or an alkoxy group.

As described above, the additive 420l may enhance the response time of the liquid crystal 410. Specifically, by using liquid crystal having a high absolute value of dielectric anisotropy, the driving voltage is dropped, thus reducing power consumption. Also, the additive 420 can compensate for the delay of a response time due to the use of liquid crystal with high absolute value of dielectric anisotropy.

The additive 420 includes particles having a dipole moment characteristic when an electric field is applied thereto. Specifically, when the additive 420 having the dipole moment characteristic by the electric field applied thereto is added into the liquid crystal layer 400, strong torque occurs in the additive 420 in applying an electric field for driving an LCD device, and thus, liquid crystal molecules 410 near the additive 420 can be more easily rotated by the strong torque. Also, due to the torque occurring in the additive 420, the same or similar torque occurs in each of the liquid crystal molecules 410 near the additive 420, thereby enabling the easier rotation of the liquid crystal molecules 410.

The particle having the dipole moment characteristic by the electric field applied thereto may comprise $ZrO_2$ particle, and particularly, $ZrO_2$ particle having a nano size.

Especially, the particles included in the additive 420 may have an average diameter of 5 nm to 100 nm. Here, the average diameter denotes an average of the minimum diameter and maximum diameter of particles.

When the average diameter of the particles is less than 5 nm, the response time of liquid crystal cannot be reduced because a particle size is excessively small. When the average diameter of the particles is more than 100 nm, the particles cannot uniformly be distributed inside the liquid crystal layer 400, and also, transmittance of an LCD device can be reduced.

The size of the additive 420 may be larger than size of a liquid crystal molecule 410 such that a rotation motion of the additive 420 causes the liquid crystal molecule 410 to rotate. The liquid crystal molecule 410 may have a size of 20 to 30 Å.

Moreover, the additive 420 may be added by 0.1 wt % to 5 wt % of entire weight of the liquid crystal layer 400.

When the additive 420 is added by less than 0.1 wt % of entire weight of the liquid crystal layer 400, the response time of the liquid crystal 410 cannot be reduced by the additive 420. On the other hand, when the additive 420 is added by more than 5 wt % of entire weight of the liquid crystal layer 400, light transmittance can be reduced.

The above-described LCD device is illustrated as an example of IPS-mode LCD devices, and the IPS-mode LCD device according to the present invention is not limited to the structure. IPS-mode LCD devices having various structures, known to those skilled in the art using the liquid crystal layer 400 containing the additive, may be within the scope of the present invention.

Figure 6:
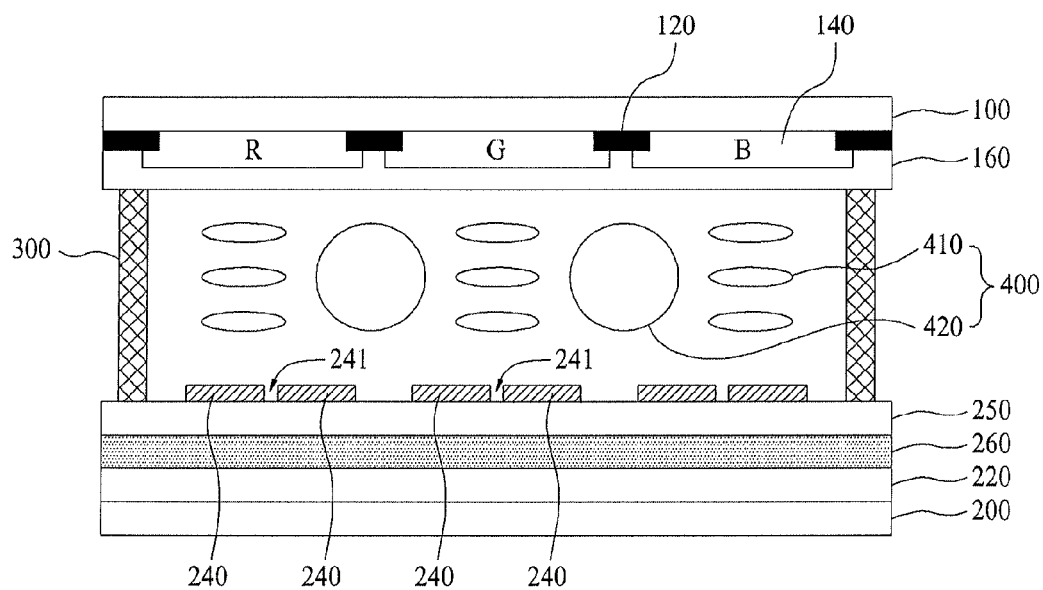
FIG. 6 is a sectional view schematically illustrating an LCD device according to another embodiment of the present invention, and relates to an FFS-mode LCD device.

FIG. 6 is a sectional view schematically illustrating an LCD device according to another embodiment of the present invention, and relates to an FFS-mode LCD device. Except that the pixel electrode 240 and common electrode 260 generating an electric field for driving the liquid crystal 410 are changed in structure, the LCD device of FIG. 6 is the same as the above-described LCD device of FIG. 3. Accordingly, like reference numerals refer to like elements, and thus, a repetitive description on the same element is not provided. As seen in FIG. 6, the array layer 220 is formed on the second substrate 200, the common electrodes 260 are formed on the array layer 220, an insulating layer 250 is formed on the common electrodes 260, and the pixel electrodes 240 are formed on the insulating layer 250.

In detail, the pixel electrodes 240 are formed on the upper surface of the insulating layer 250, and the common electrodes 260 are formed under the lower surface of the insulating layer 250. The pixel electrodes 240 respectively include a plurality of slits 241, and are substantially formed in a finger shape. The common electrodes 260 are substantially formed in a plate shape. Thus, fringe fields are generated through the slits 241 of the pixel electrodes 240, and adjust an alignment direction of the liquid crystal 410.

The insulating layer 250 may be formed of an inorganic insulator such as silicon nitride or silicon oxide, but is not limited thereto. As another example, the insulating layer 250 may be formed of an organic insulator such as an acryl-based polymer. The insulating layer 250 may be formed in a double-layer structure of an inorganic insulator and an organic insulator.

Although not shown, a common electrode including a plurality of slits may be formed on the upper surface of the insulating layer 250, and a pixel electrode in a plate shape may be formed in plurality under the lower surface of the insulating layer 250.

The above-described LCD device is illustrated as an example of FFS-mode LCD devices, and the FFS-mode LCD device according to the present invention is not limited to the structure. FFS-mode LCD devices having various structures, known to those skilled in the art using the liquid crystal layer 400 containing the additive, may be within the scope of the present invention.

In the above-described LCD device, it has been described above that the pixel electrodes and the common electrodes are formed on the same substrate. However, as another example, the technical features of the present invention may be applied to a mode (for example, a VA mode or a TN mode) in which the pixel electrodes and the common electrodes are formed on different substrates. This example may also be within the scope of the present invention.

According to the embodiments of the present invention, by adding the additive including the particles having the dipole moment characteristic when an electric field is applied thereto into the liquid crystal layer, the response time of the liquid crystal can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:
  first and second substrates facing each other;
  a sealant formed between the first and second substrates, and adhering the first substrate to the second substrate; and
  a liquid crystal layer formed between the first and second substrates,
  wherein the liquid crystal layer comprises a mixture of liquid crystal and an additive having a dipole moment characteristic when an electric field is applied thereto, the liquid crystal being negative liquid crystal, the additive having non-liquid crystal material properties.

2. The LCD device of claim 1, wherein an average diameter of the additive is 5 nm to 100 nm.

3. The LCD device of claim 1, wherein the additive is added by 0.1 wt % to 5 wt % of entire weight of the liquid crystal layer.

4. The LCD device of claim 1, wherein the liquid crystal has an absolute value ($|\Delta\epsilon|$) of dielectric anisotropy in the range of 2 to 20.

5. The LCD device of claim 1, wherein the additive comprises $ZrO_2$ particles.

6. The LCD device of claim 1, wherein the liquid crystal includes a plurality of liquid crystal molecules and wherein size of the additive is larger than size of each one of the liquid crystal molecules such that a rotation motion of the additive causes the liquid crystal molecules to rotate.

7. The LCD device of claim 1, wherein a plurality of pixel electrodes and common electrodes for driving the liquid crystal are formed on the first substrate.

8. The LCD device of claim 7, wherein the plurality of pixel electrodes and common electrodes are alternatively arranged to generate lateral electric fields.

9. The LCD device of claim 7, wherein the plurality of pixel electrodes and common electrodes are disposed in the same layer on the first substrate.

10. The LCD device of claim 7, wherein the plurality of pixel electrodes and common electrodes are disposed in different layers on the first substrate.

11. The LCD device of claim 1, wherein the negative liquid crystal has a material expressed by the following formula:

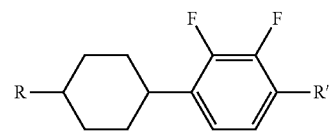

wherein each of R and R' is hydrogen, an alkyl group, an alkenyl group, or an alkoxy group.

12. The LCD device of claim 1, wherein the negative liquid crystal has a material expressed by the following formula:

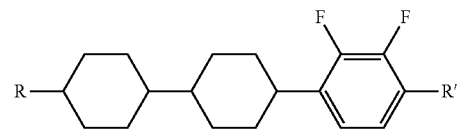

wherein each of R and R' is hydrogen, an alkyl group, an alkenyl group, or an alkoxy group.

13. The LCD device of claim 1, wherein the negative liquid crystal has a material expressed by the following formula:

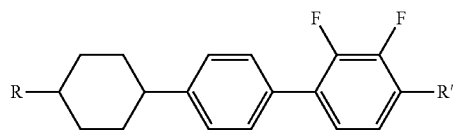

wherein each of R and R' is hydrogen, an alkyl group, an alkenyl group, or an alkoxy group.

14. A liquid crystal display (LCD) device, comprising:
first and second substrates facing each other;
a sealant formed between the first and second substrates, and adhering the first substrate to the second substrate;
a liquid crystal layer formed between the first and second substrates and including a plurality of liquid crystal molecules, the plurality of liquid crystal molecules being negative liquid crystal molecules; and
a plurality of particles dispersed in the liquid crystal layer and configured to rotate when an electric field is applied thereto such that torque is transferred to the liquid crystal molecules adjacent to each particle, wherein the plurality of particles have non-liquid crystal material properties.

15. The LCD device of claim 14, wherein the particles have a dipole moment characteristic.

16. The LCzzD device of claim 14, wherein size of a liquid crystal molecule is smaller than size of a particle.

17. The LCD device of claim 14, wherein the particles comprise $ZrO_2$ particles.

* * * * *